(12) United States Patent
Putman

(10) Patent No.: US 7,613,643 B1
(45) Date of Patent: Nov. 3, 2009

(54) CASH DISPENSING AUTOMATED BANKING MACHINE AND METHOD

(75) Inventor: Harold V. Putman, Canal Fulton, OH (US)

(73) Assignee: Diebold, Incorporated, North Canton, OH (US)

( * ) Notice: Subject to any disclaimer, the term of this patent is extended or adjusted under 35 U.S.C. 154(b) by 446 days.

(21) Appl. No.: 11/136,865

(22) Filed: May 25, 2005

Related U.S. Application Data

(62) Division of application No. 09/233,249, filed on Jan. 19, 1999.

(60) Provisional application No. 60/105,800, filed on Oct. 27, 1998.

(51) Int. Cl.
*G06Q 40/00* (2006.01)
(52) U.S. Cl. .......................... 705/35; 705/37
(58) Field of Classification Search ............. 705/10–44
See application file for complete search history.

(56) References Cited

U.S. PATENT DOCUMENTS

| | | | |
|---|---|---|---|
| 5,386,104 A | * | 1/1995 | Sime .......................... 235/379 |
| 5,933,816 A | | 8/1999 | Zeanah et al. |
| 6,085,177 A | * | 7/2000 | Semple et al. ................ 705/43 |
| 6,292,789 B1 | * | 9/2001 | Schutzer ...................... 705/40 |
| 6,334,117 B1 | * | 12/2001 | Covert et al. .................. 705/43 |

* cited by examiner

*Primary Examiner*—Frantzy Poinvil
(74) *Attorney, Agent, or Firm*—Christopher L. Parmelee; Ralph E. Jocke; Walker & Jocke

(57) ABSTRACT

A automated transaction machine (3) is operative to conduct transactions in response to user interaction with a user interface. The transaction machine includes a computer (10) including at least one connected input device (21) for receiving inputs. The computer also includes at least one output device (23) for providing outputs on a screen or other output device responsive to a user interface output (15) from the computer. The computer further includes in software a transaction machine interface (TMI) (18) operative to control the user interface output. The computer further includes in software at least one event processor (16) which interfaces with the TMI. An instruction document (20) accessible by the computer includes command instructions (22). The TMI controls the user interface output responsive to the command instructions. The TMI is operative responsive to input signals and the current user interface output to selectively direct events (17) to an event processor (16) software component. The event processor is operative responsive to the event to operate transaction function devices in connection with the automated transaction machine, and to have the TMI modify the user interface output responsive to the operation of such devices.

7 Claims, 12 Drawing Sheets

CASH DISPENSING AUTOMATED BANKING MACHINE AND METHOD

CROSS REFERENCE TO RELATED APPLICATIONS

This application is a divisional of copending application Ser. No. 09/233,249 filed on Jan. 19, 1999. This application and application Ser. No. 09/233,249 filed Jan. 19, 1999 claim the benefit pursuant to 35 U.S.C. § 119 (e) of U.S. provisional application No. 60/105,800 filed Oct. 27, 1998. The disclosures of each of the above mentioned applications are incorporated herein by reference.

TECHNICAL FIELD

This invention relates to automated transaction machines. Specifically this invention relates to an automated transaction machine with programming that is easier to configure and customize compared to traditional automatic transaction machines.

BACKGROUND ART

Automatic transaction machines are known in the prior art. A common type of automated transaction machine used by consumers is an automated teller machine ("ATM"). ATMs enable customers to carry out banking transactions. Common banking transactions that may be carried out with ATMs include the dispensing of cash, the making of deposits, the transfer of funds between accounts, the payment of bills and account balance inquiries. Other types of automated transaction machines may allow customers to charge against accounts or to transfer funds. Other types of automated transaction machines may print or dispense items of value such as coupons, tickets, wagering slips, vouchers, checks, food stamps, money orders, scrip or travelers checks. The types of banking transactions a customer can carry out are determined by the capabilities of the particular transaction machine and the programming of the institution operating the machine. For purposes of this disclosure an automated transaction machine shall encompass any device which carries out transactions including transfers of value.

Currently ATMs are created with specialized hardware and software dedicated for a specific set of operations. Typically the software for controlling an ATM is created to only work with a specific type of ATM. ATMs with different types of configurations of transaction function devices such as sheet dispensers or deposit mechanisms, in many cases use different programs specifically developed for those devices or for the particular configuration of machine. Even ATM models of the same type may require different versions of the controlling software depending on the human language that is needed for the user interface. Thus, the more permutations of hardware and program functionality that are required, the more dedicated programs must be written. Furthermore, even if a program could be written that is capable of controlling many different types of ATMs with outputs in a wide range of human languages, this program would still not run on any ATM that uses hardware or an operating system that is incompatible with the machine code that the program was compiled into. The program at best must be recompiled for the target hardware and at worst must be completely rewritten in a computer language that is specific to the hardware.

Consequently there exists a need for a programming scheme that will flexibly port to many different types of automated transaction machines without limiting the types of hardware that can be used for the ATMs. There further exists a need to be able to easily modify a behavior of ATM programs after they are written without the need to recompile. There further exists a need to isolate or decouple the hardware specific software components from the more generic human interface software components in an ATM. Thus when changes need to be made to the user interface, the hardware specific software components do not also need to be modified. Likewise when the hardware specific software is modified the user interface does not always need to be modified. There also exists a need to simplify the programming of the human user interface without limiting the breadth of programming options available for creating the hardware specific software components.

DISCLOSURE OF INVENTION

It is an object of the present invention to provide an automated transaction machine at which a user may conduct transactions.

It is a further object of the present invention to provide an automated transaction machine that uses a programming system that will flexibly port to many different types of automated transaction machines regardless of hardware or operating system.

It is a further object of the present invention to provide an automated transaction machine with a user interface software component that can be easily modified without being recompiled.

It is a further object of the present invention to provide an automated transaction machine in which the hardware specific software components and the user interface software components are isolated or decoupled to enable more productive programming.

It is a further object of the present invention to provide an automated transaction machine that uses a programming system that simplifies the creation of the user interface features without limiting the breadth of programming options available for creating the hardware specific software components.

Further objects of the present invention will be made apparent in the Following Best Modes for Carrying Out Invention and appended claims.

The foregoing objects are accomplished in an exemplary embodiment of the invention by an automated transaction machine that includes a computer. The computer is defined as including transaction function devices including output devices such as a display screen, and input devices such as a keypad or touch screen. In one embodiment the transaction machine includes other transaction function devices in operative connection with the computer. Examples of such other devices include a dispenser for sheets such as currency, a printer mechanism, a card reader/writer, a depository mechanism and other physical transaction function devices that are used by the machine to accomplish transactions. The transaction machine may be in operative connection with a host system such as a network processor or a clearinghouse for validating accounts, transferring funds or determining credit availability.

The computer includes software programs that are executable therein. The software programs include a transaction machine interface software component (TMI). The TMI is preferably configured to receive input signals from the input devices of the computer and is configured to control the output signals to an output device of the computer so as to generate a user interface. This user interface output is preferably composed of visual elements that provide a user with instructions for operating the automated transaction machine.

The software in the computer further preferably includes one or more event processor software components. The event processors include software logic and/or business rules for controlling the operation of the machine. In one form of the invention the transaction function devices are controlled responsive to the event processors. One or more instruction documents are accessible by the computer. The instruction documents contain command instructions. The TMI is operative to read the instruction documents and to control user interface output by the computer response to the command instructions.

The TMI is further operative to monitor input signals from input devices such as a keypad connected with the computer. Depending on the current user interface being generated and the type of input signal, the TMI will selectively generate an event. Preferably this event is representative of user activity with the user interface, such as when information has been changed or when an action command has been input.

The TMI is further operative to dispatch the event to one of the event processors. The command instructions include instructions for designating which event processor the TMI should use. In the exemplary embodiment the event processor includes a Dynamic Link Library (DLL). To send the event to the event processor, the TMI calls an event processing function in the DLL. The event processor is operative responsive to the event to selectively execute a software function, such as controlling a transaction function device or validating a password that has been entered by a user.

The TMI is further operative to modify the user interface output responsive to the activity of the event processor responsive to the event. Consequently, after the event processor has processed an event, it can instruct the TMI to modify the user interface output to reflect the outcome of the processed event.

Embodiments of the present invention may also include the capability of controlling the user interface output, and the ability of the event processors to query the TMI for information about the user interface output.

A useful aspect of the invention is that it associates the procedural logic with the hardware specific event processors while the configuration of the user interface output is defined by the hardware independent command instructions of the instruction documents. Thus the user interface is generally decoupled from the business rules that control the automated transaction machine. This results in an automated transaction machine that is easier to produce, can more easily port to different hardware platforms, and is easier to modify and configure.

BEST MODES FOR CARRYING OUT INVENTION

Figure 1:
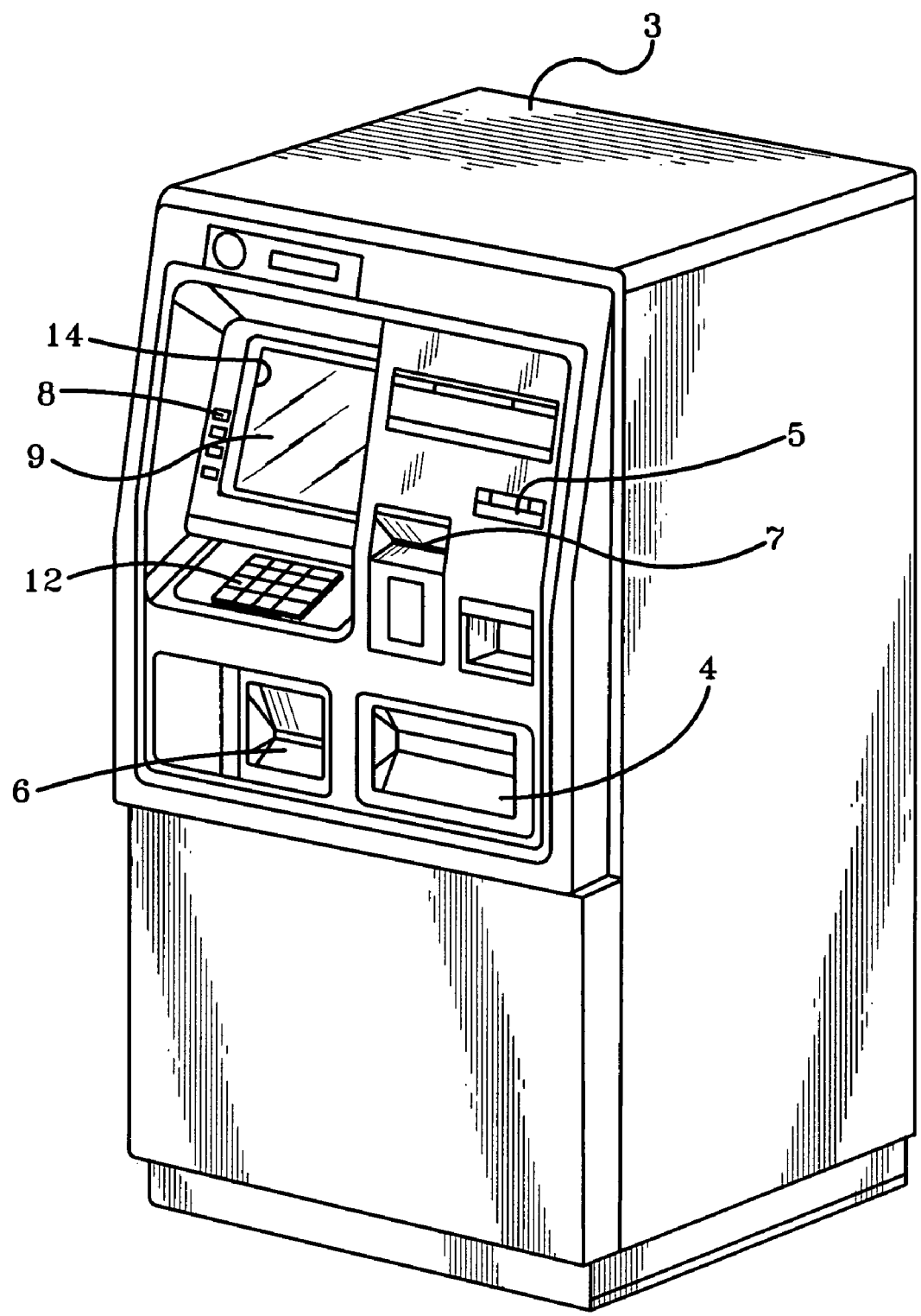
FIG. 1 is an exterior view of an ATM representative of one embodiment of an automated transaction machine incorporating the present invention.

Referring now to the drawings and particularly to FIG. 1, there is shown the exterior view of an ATM 3 which is representative of an automated transaction apparatus incorporating the present invention. The ATM includes user interactive elements. These elements include: an output device such as a display screen 14; input devices 12 such as function keys 8, a keypad 12, a touch screen 9; and a card reader 7; and a number of other transaction function devices such as a sheet dispenser 4, a printer 5, and a depository 6. Of course, in other embodiments other types of transaction function devices may be used.

Figure 2:
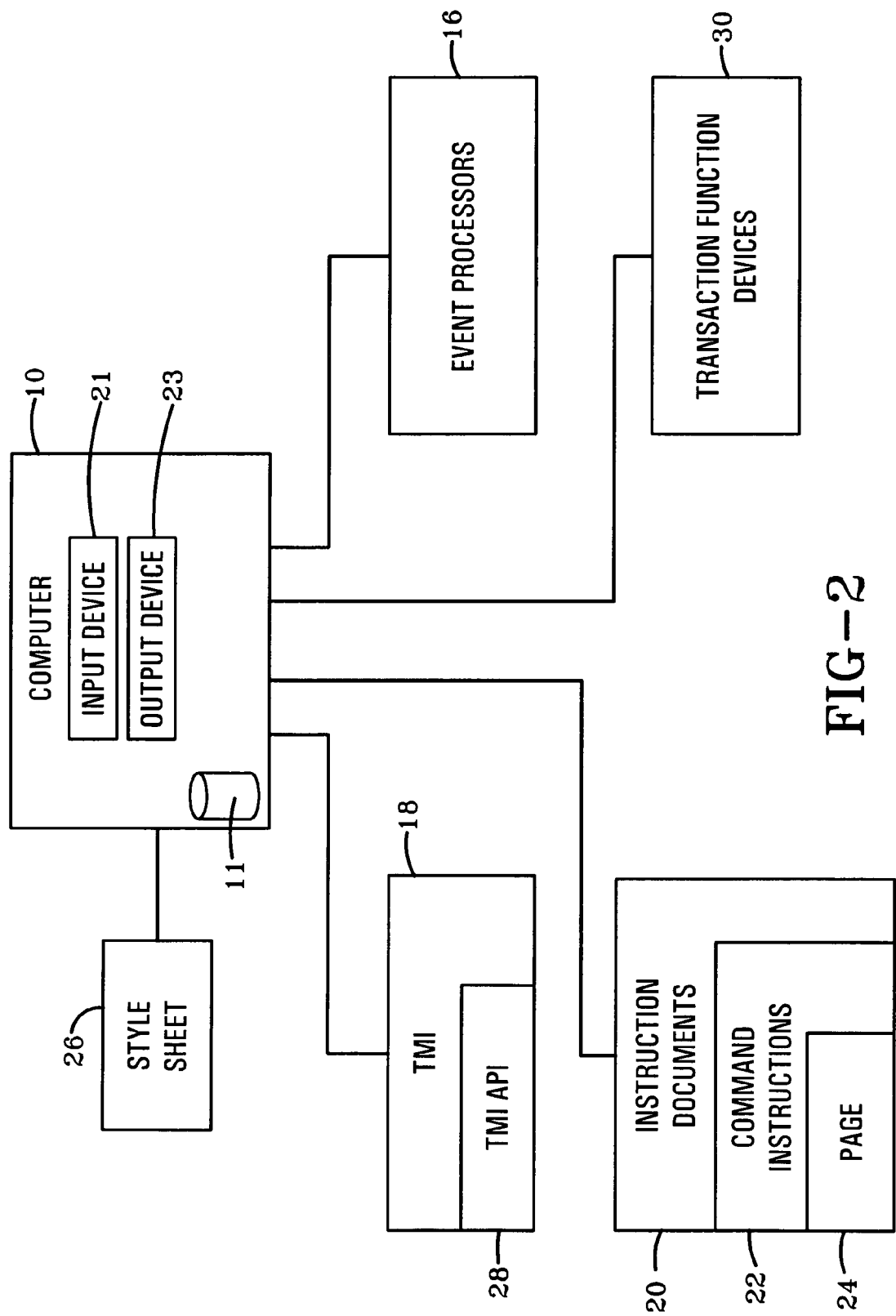
FIG. 2 is a schematic view representative of the hardware and software architecture of one exemplary embodiment of an automated transaction machine of the present invention.

FIG. 2 schematically represents hardware and software components included in an exemplary automated transaction apparatus which apparatus comprises an embodiment of the present invention. The elements include a computer schematically indicated 10. The computer 10 as represented includes at least one input device 21, and at least one output device 23. The input and output devices may be input and output devices of the types discussed previously in connection with ATM 3. The computer 10 is operatively connected to transaction function devices 30. The transaction function devices 30 may be transaction function devices of the types discussed in connection with ATM 3, but which are not included among the transaction function devices referred to as input and output devices. It should be understood however that this designation is a matter of convention herein and many transaction function devices may provide inputs and outputs and may operate in connection with the computer like the input and output devices which are considered a part of the computer for purposes of the description herein.

The exemplary form of the invention also includes one or more event processor software functions 16 and a Transaction Machine Interface software component (TMI) 18 which are both in operative connection with the computer 10. In the described embodiment the event processor 16 includes at least one DLL and the TMI includes at least one executable program. Computer 10 also has access to one or more instruction documents 20. These instruction documents 20 include command instructions 22. In an exemplary embodiment these instruction documents 20 may be written in ASCII plain text and can be easily created and modified with a simple text editor. In the described embodiment of the transaction apparatus the event processor 16, TMI 18 and instruction documents 20 reside in the hard drive or other storage medium 11 in the computer 10. Of course in other embodiments such components may reside in other computers or systems which are in operative connection with computer 10.

It should further be understood that although in the exemplary embodiment of the invention the event processor and TMI are comprised of software, in other embodiments of the invention all or portions of the instruction steps executed by the event processor and TMI may be resident in firmware or in other program media in connection with one or more computers, which are in operative communication with the computer 10. For purposes of this description the term software shall be construed to refer to all forms of executable instructions.

Figure 3:
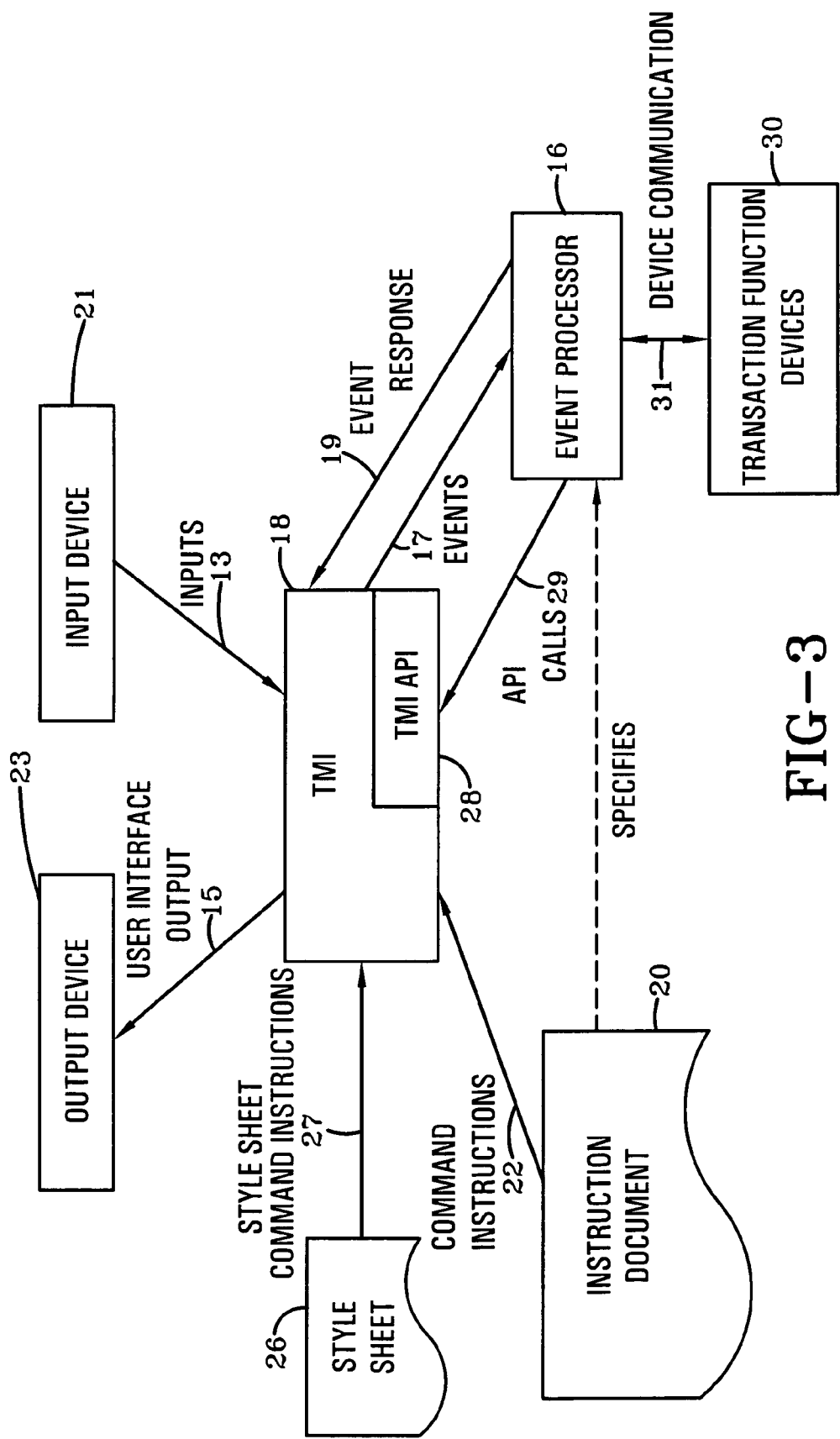
FIG. 3 is a schematic view representative of the interaction between elements in one exemplary embodiment of the automated transaction machine
Figure 4:
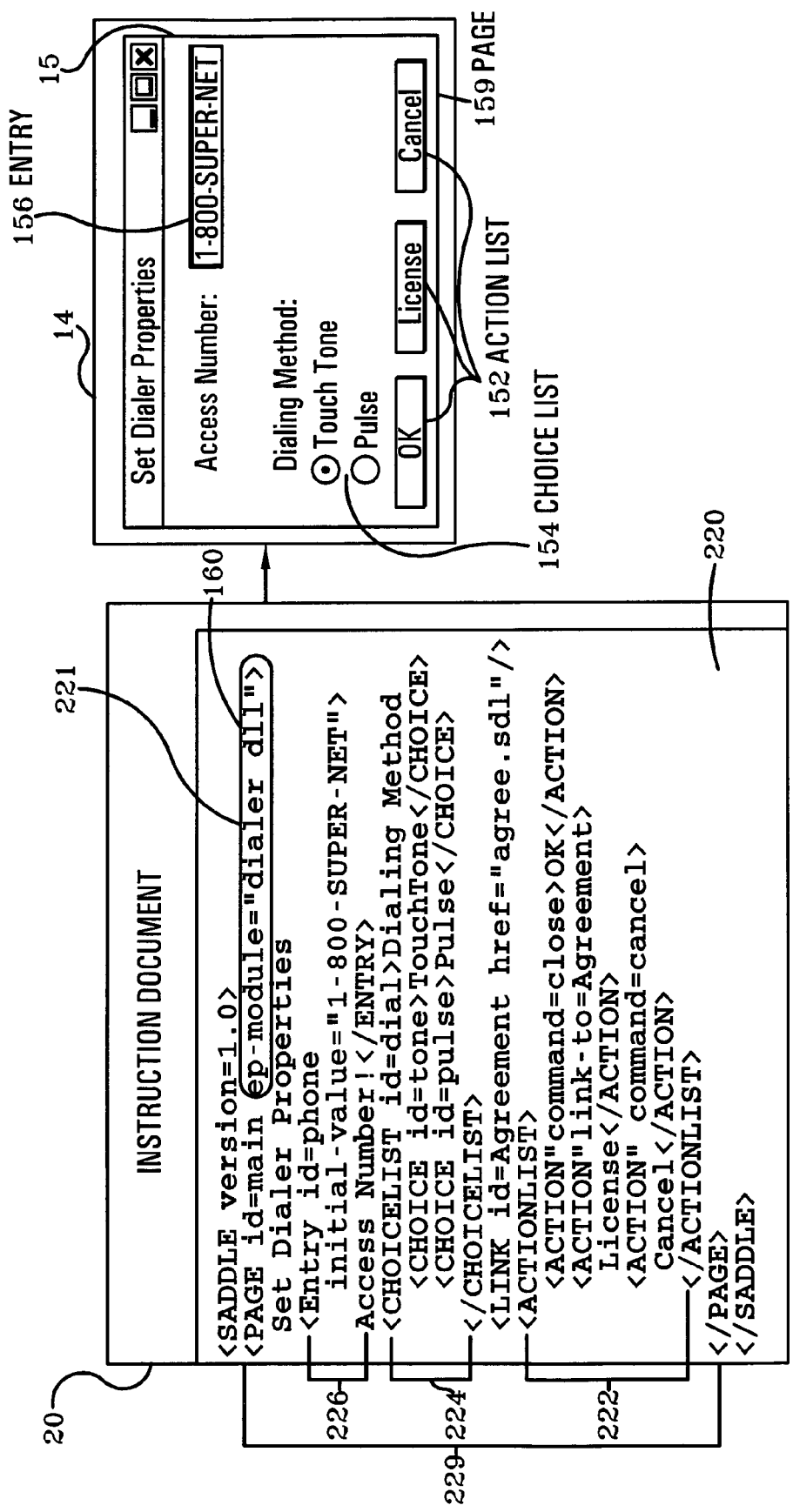
FIG. 4 is a schematic view representative of command instructions in an instruction document and the resulting user interface generated producing an output on a computer display screen.

FIG. 3 is a schematic view representative of the interaction between the different elements of the embodiment represented in FIG. 2. The TMI 18 is operative to read the command instructions 22 in the instruction document 20. The TMI 18 is further operative responsive to these command instructions to control the user interface output to the output device 23 of the computer 10. The user interface output is operative to cause an output device such as display screen 14, to display a user interface screen. A user interface output indicated 15 is preferably operative to produce viewable images which contain information or instructions to facilitate operation of the automated transaction machine by a user. Such information in the preferred embodiment may typically include alphanumeric text and visual objects such as action buttons. Of course in other embodiments other user interfaces suitable for use in connection with other output devices may be used. FIG. 4 which is later discussed in detail, represents an example of an instruction document 20 and a corresponding viewable image produced on the display screen responsive to user interface output 15.

Referring again to FIG. 3, the computer is in operative connection with a style sheet 26. Style sheet 26 includes therein style sheet command instructions 27. As represented in FIG. 3 the TMI 18 is further operative responsive to the style sheet command instructions 27 to organize or arrange the visual elements that are produced by the output device responsive to a user interface output 15.

The TMI 18 is further preferably operative to selectively monitor input signals 13 from one or more input devices schematically represented by the input device 21. Depending on the currently generated user interface output 15, the TMI is operative to cause the computer to make changes to the user interface output, to generate an event 17, or both. Events are groups of selected information about user interaction with the machine responsive to a user interface output. In the described embodiment events are generated by the TMI 18 in response to input signals 13 from input device 21.

Figure 5:
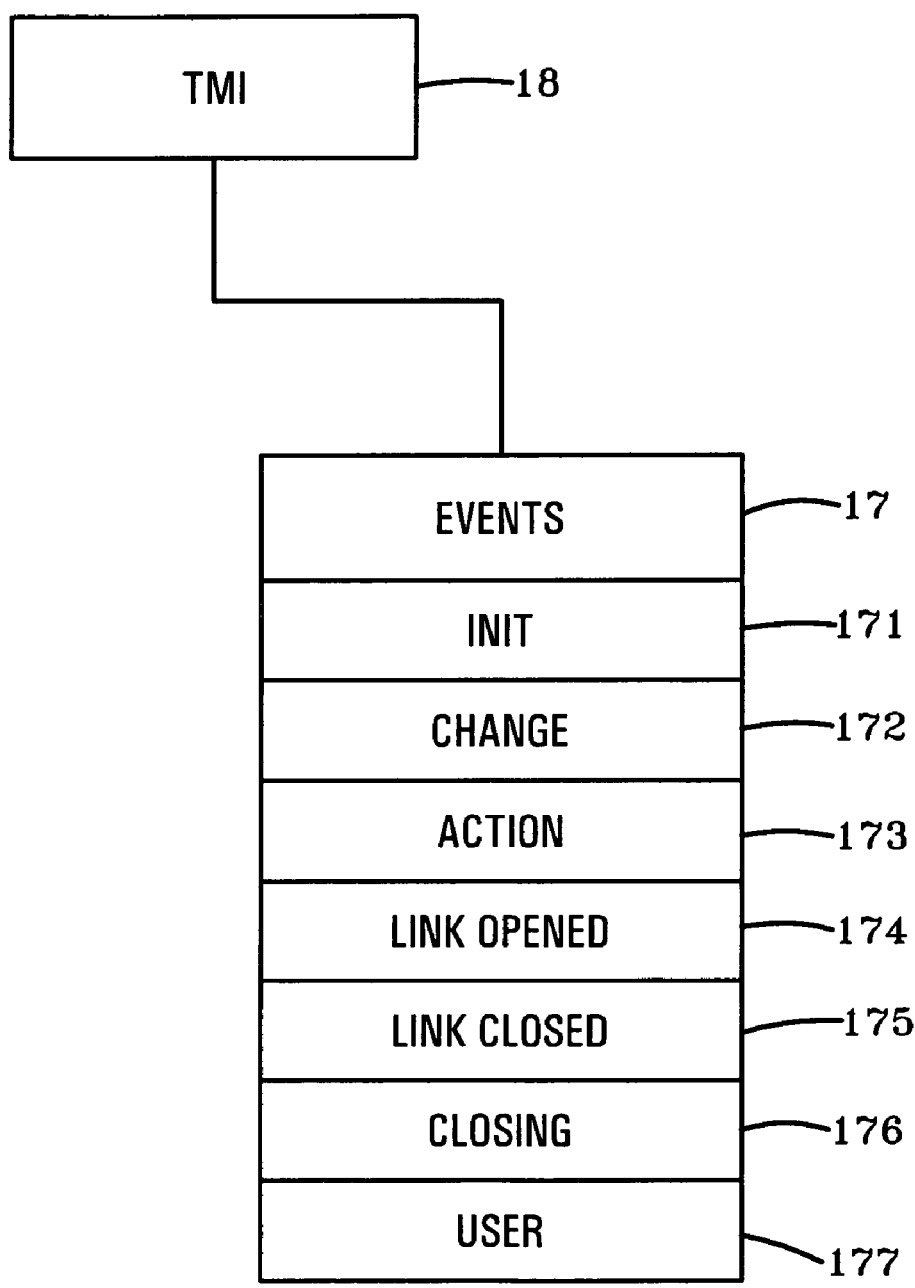
FIG. 5 is a schematic view representative of the different types of events generated by the TMI in one exemplary embodiment of the automated transaction machine.

FIG. 5 schematically represents different events that are generated by the TMI 18 in an exemplary embodiment. Examples of events include an initiate or init event 171, a change event 172, an action event 173, a link opened event 174, a link closed event 175, a closing event 176, and one or more user defined events 177.

Referring again to FIG. 3, when the TMI 18 generates an event schematically indicated 17, the TMI is operative to dispatch the event to an event processor 16. In embodiments where there is more than one event processor, the command instructions specify the event processor to which the event should be dispatched. The event processor 16 receives the event, and is operative to process the event. Generally, the event processor in response to the event responds back to the TMI 18 with an event response schematically indicated 19. In the described embodiment the event response 19 may be a "continue" response or a "stop" response. When the TMI 18 receives a "stop" response the TMI is generally operative to discontinue the operation that triggered the event. In addition the event processor may be further operative responsive to the receipt of an event to communicate with and control the operation of one or more transaction function devices 30. As previously discussed the controlled transaction function devices may include devices which operate to carry out transactions including devices such as sheet dispensers, printers and depositories as well as input and output devices which may receive or produce electronic or human perceivable inputs and outputs.

Figure 6:
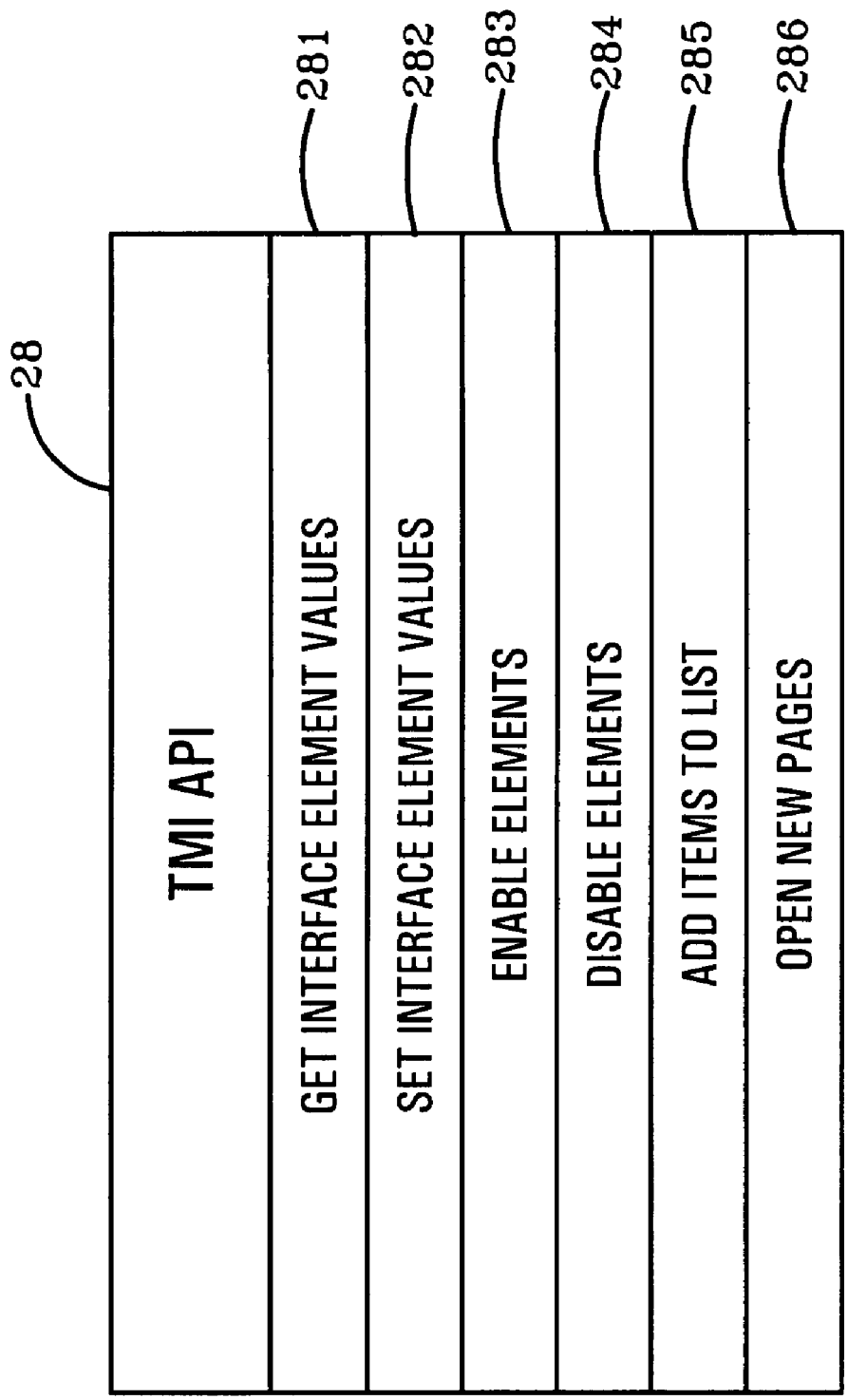
FIG. 6 is a schematic view representative of different software functions the TMI can perform responsive to the event processor in one exemplary embodiment of the automated transaction machine.

In the exemplary embodiment, the TMI 18 includes an application programming interface (API) 28. The TMI API includes a number of specialized functions that are accessible by an external software component such as the event processors 16. When the event processor requires additional information about the user interface output, or when the event processor requires that the TMI modify the user interface output, it may do so through messages to the API schematically represented as calls 29. Calls 29 are operative to cause one or more TMI API subroutines to be executed. FIG. 6 schematically represents the TMI API 28 and different types of API subroutines in an exemplary embodiment. These subroutines include a get interface element value subroutine 281, a set interface element value subroutine 282, an enable element subroutine 283, a disable element subroutine 284, an add items to list subroutine 285, and an open new pages subroutine 286.

In the described embodiment the event processors generally possess procedural programming logic for operating the automated transaction machine, controlling the transaction function devices and manipulating the TMI. Thus the described embodiment of the invention maximizes decoupling of the user interface output which is managed by the TMI, from the procedural logic and/or business rules that control the inner workings of the system components handled by the event processors. Another advantage for this approach is that it is more efficient to program. The high level user interface output may be controlled by the TMI responsive to hardware independent command instructions in text based documents. Such text based command instructions may be relatively easy to program, develop and modify. The low level control of system components by the event processors may be coded in appropriate low level hardware dependent languages such as compiled C or C++.

The command instructions used to control user interface outputs in the exemplary embodiment may be based on the extensible markup language (XML) specification. The command instructions may include XML tags that define the visual elements for a user interface. These XML tags correspond to user interface elements that can be displayed by a wide range of computer display screens. It should be understood that in other embodiments other forms of command instructions may be used.

Figure 7:
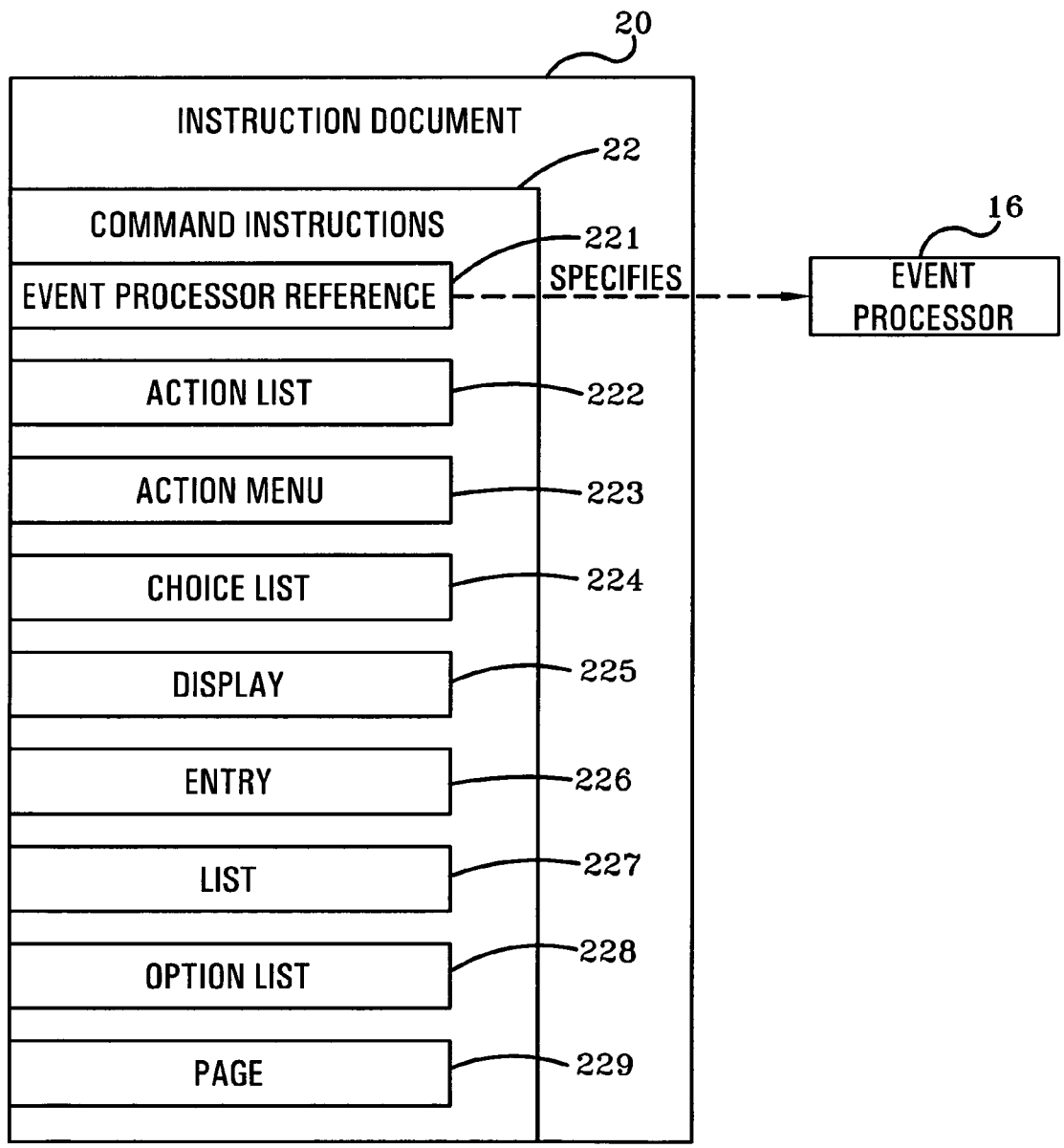
FIG. 7 is a schematic view representative of an instruction document comprising command instructions in one exemplary embodiment of the automated transaction machine.

FIG. 7 is a schematic view of different command instructions 22 that may be used in the described embodiment. Represented are commands for creating visual elements, including commands for creating action lists 222, action menus 223, choice lists 224, display fields 225, entry fields 226, lists 227, option lists 228, and page windows 229. FIG.

Figure 8:
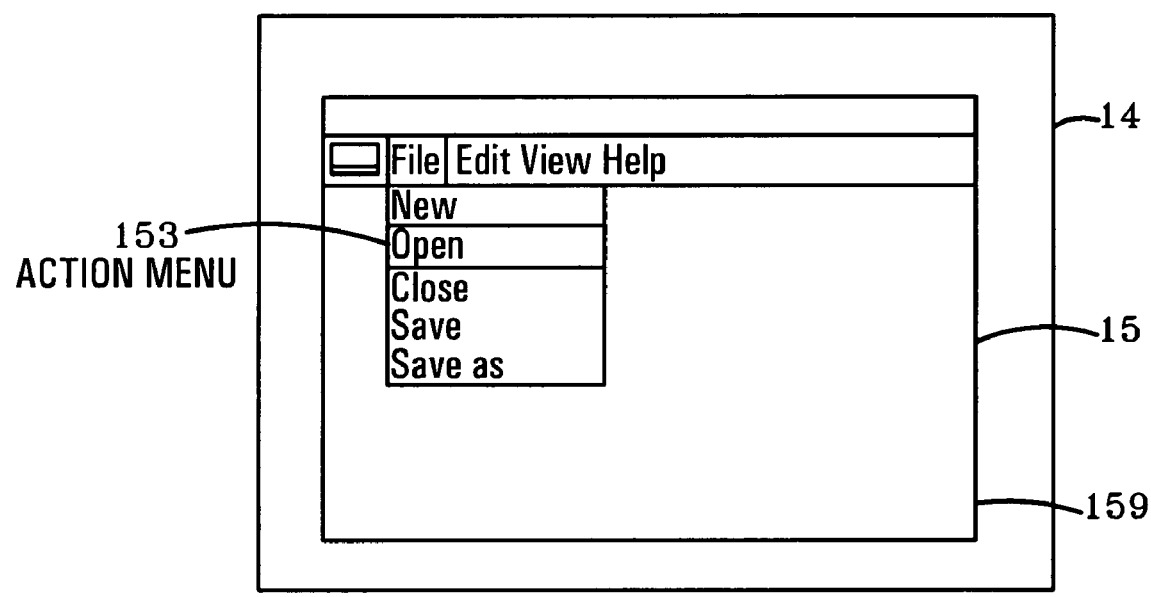
FIG. 8 is a schematic view representative of an action menu that is produced on a display responsive to a user interface output by the computer in one exemplary embodiment of the automated transaction machine.

4 shows examples of the visual elements output on a display such as display 14, responsive to such command instructions. The visual elements include an action list 152, a choice list 154, and an entry field 156 which are presented with a user interface page window 159 responsive to command instructions 222, 224, 226 and 229 respectively, included in instruction document 20. FIG. 8 shows an example of a user interface output on a display which includes an action menu 153 which is the visual element produced responsive to an action menu command instruction in an instruction document.

One advantage of the described configuration is that the same instruction document can be used for controlling different types of automated transaction machines that have different types of output devices. For example, the invention may be used with machines that have high resolution graphical displays as well as machines that have low resolution character based displays. In the use of the exemplary embodiment each hardware platform may have a specific TMI optimized to run on that particular type of associated hardware. Each TMI is operative to interpret the command instructions and to provide a user interface output that is appropriate for the type of display screen (and/or other output devices) included in that transaction machine. This enables the same instruction document to be used with various hardware types.

Figure 9:
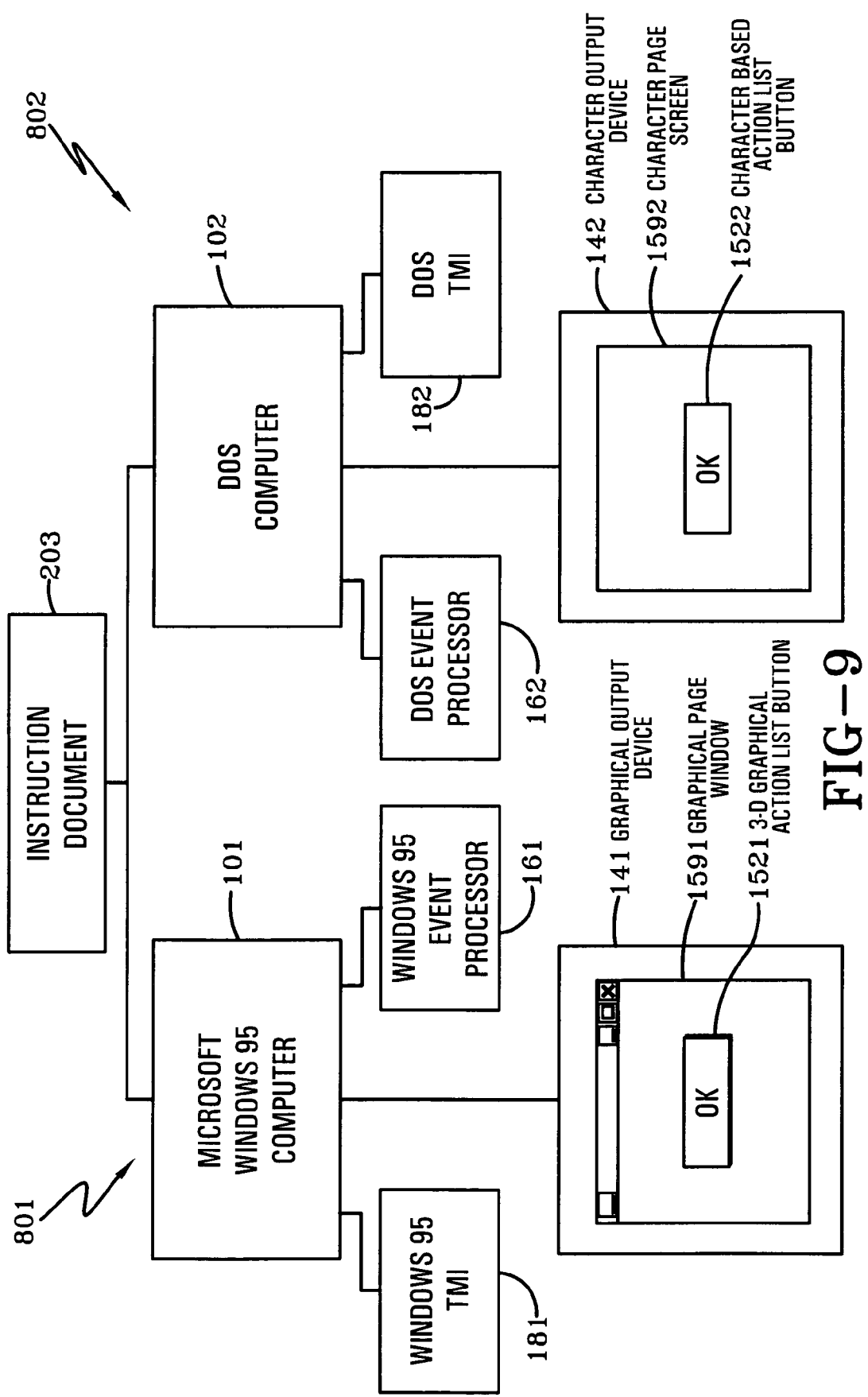
FIG. 9 is a schematic view representative of the two different types of automatic transaction machines utilizing the same instruction document for generating user interface outputs.

FIG. 9 schematically represents how the teachings of the present invention may be utilized in connection with two different types of automated transaction machines schematically indicated 801 and 802. The first machine 801 includes a computer 101 which operates in a Microsoft® Windows 95® environment, which computer includes a TMI 181 and an event processor 161. Machine 802 has a computer 102 operating in a DOS environment which includes a TMI 182 and an event processor 162. The Windows 95® based TMI 181 generates user interface outputs that produce visible outputs on a graphical display device 141. TMI 181 operates responsive to command instructions included in an ASCII text instruction document 203 to cause the computer 101 to produce on the display device 141 a graphical user interface output page window 1591 which includes a simulated 3-D graphical action list button 1521.

The DOS based automated transaction machine 802 includes a TMI 182 which controls the output of a character based display device 142. TMI 182 is operative responsive to the ASCII text instruction document 203 to cause computer 102 to produce on display device 142 a character based user interface output page screen 1592 which includes a character based action list button 1522. Thus the same instruction document may be used to generate the appropriate interface for very different types of automated transaction machines.

Another advantage of systems employing certain forms of the present invention is the ability to easily reconfigure the user interface without recompiling. Once the TMI has been written for a particular type of hardware platform, the same TMI can be used in many different operating configurations of automated transaction machines. Substantially different types of user interfaces with which users interact to control a transaction machine need not be generated by specialized compiled software, but instead may be produced by utilizing different text based XML documents or other similar instruction documents. Using the principles of the present invention for example, an automated transaction machine may be easily modified to provide a user interface in a different human language by translating the XML user elements that display text in the user interface.

Alternative embodiments of the invention may have more complex user interface elements such as tree structures, list views, bitmaps, and/or pop-up menus. It should be understood that the user interface elements are not limited to the examples mentioned herein, but rather may include any visual element that is useful for customers or other users interacting with an automated transaction machine. Likewise the teachings of the invention may be used in connection with other types of output devices and corresponding internal elements for the outputs produced by such devices.

In addition to command instructions for producing visible user interface elements, embodiments of the invention may also include command instructions for non visual elements, such as elements that are representative of information. These elements may contain for example alternate text for message labels or may represent raw information that is selectively viewable in connection with user interface elements that provide visual outputs on a display. In alternative embodiments, the raw information may reside in another document stored in the data store of the automated transaction machine or in an external data store. In such situations the command instruction may supply the TMI with sufficient information to enable it to locate and retrieve the information.

In the exemplary embodiment multiple sets of command instructions for causing the computer to generate different user interface outputs can be included in one instruction document. Each set is arranged as a "page". Page instruction commands may be used to delineate each of several different sets of user interface command instructions included in the pages of the instruction document. The TMI is operative to read the instruction document and at a particular time to cause to be displayed visual elements responsive to command instructions included in a selected page of the instruction document.

Figure 10:
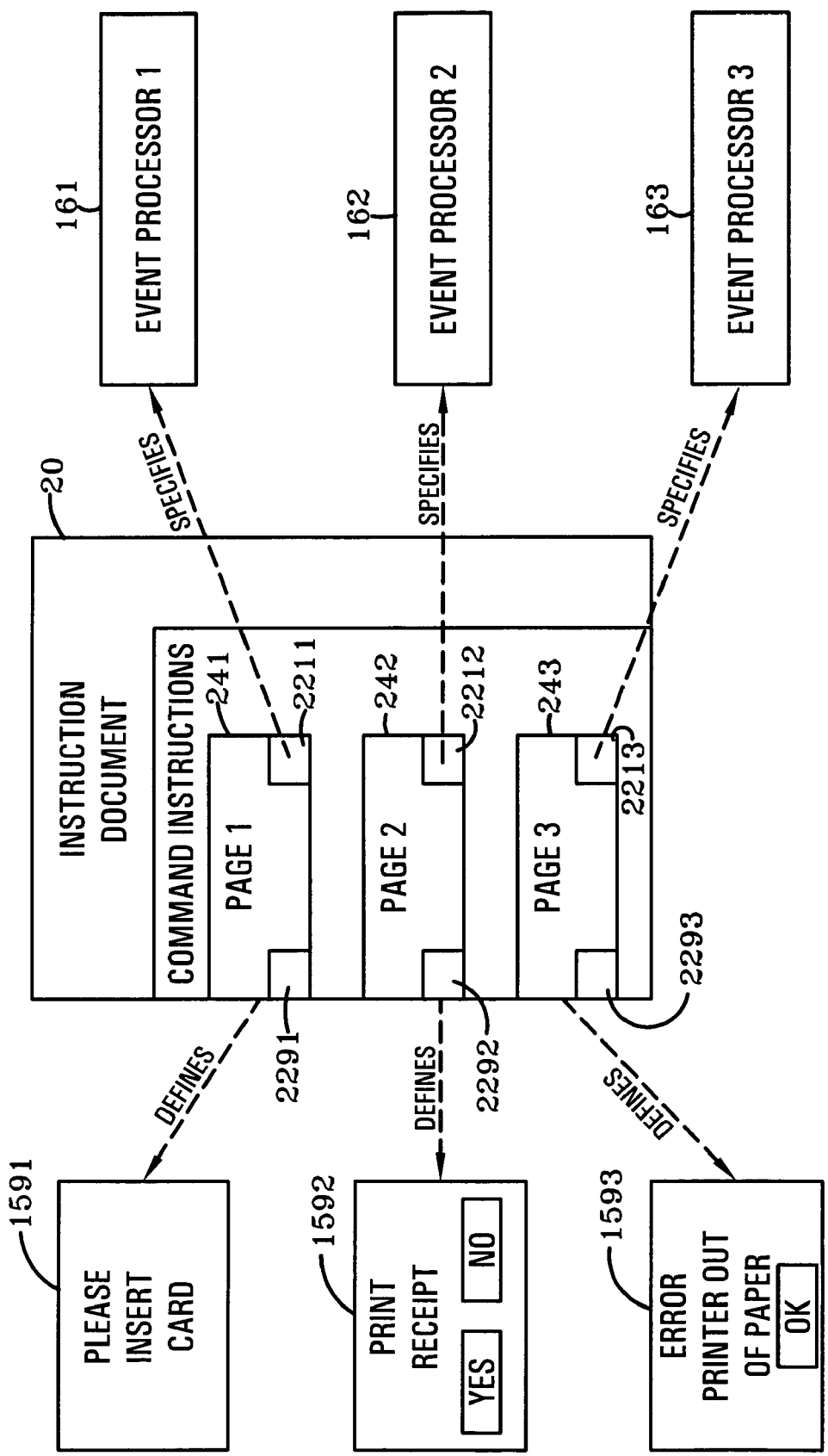
FIG. 10 is a schematic view representative of an instruction document comprising command instructions divided into pages, where each page specifies an event processor.

FIG. 10 schematically represents an instruction document where the command instructions have been grouped into pages. The document shown includes multiple pages. Each of these pages 241, 242 and 243 has a specific page command instruction 2291, 2292 and 2293 respectively, which serve to segregate and delineate each page of the command instructions. Each of these pages defines corresponding user interface outputs which produce display screens 1591, 1592 and 1593 respectively on an output device such as display screen 14. In a graphical windows type operating environment each page in the instruction document may represent a different window. In a character based system such as a DOS based system, each page may represent a different screen.

Each page in the exemplary instruction document shown in FIG. 10 further includes a corresponding event processor reference command instruction 2211, 2212 and 2213. These instructions specify which of the particular event processors 161, 162 or 163 the TMI should dispatch an event to in response to certain user activity when the user interface output is being generated responsive to the page. Thus, each page of command instructions may have its own event processor. For example when a user initiates an action event by providing an input signal corresponding to a user interface element such as an action list button 1523 in display screen 1592, the TMI is operative to dispatch an action event to the event processor 162. This is the event processor specified by the event processor reference instruction 2212 for the page 242 which generated the particular user interface output. The event processor processes the event and the automatic transaction machine performs an applicable activity responsive thereto, such as printing a receipt. In this example, if the event processor determines that there is a problem with performing the action, it may display an error screen 1593. To accomplish this, the event processor 162 may call the API function of the TMI for outputting a different user interface page 243 that includes command instructions for displaying the desired error screen 1593. It should be understood that this configuration of multi-page instruction documents, with each page interacting with one event processor is exemplary and other configurations may be used.

Referring again to FIG. 4, an example of an instruction document 20 with XML command instructions 220 is represented, with an example of a screen display produced responsive thereto. As previously mentioned, a portion of the command instructions are grouped within a single page by page command instructions 229. The resulting user interface output generated by the computer responsive to the command instructions designated by the page commands, results in a graphical user interface output page window 159. Examples of command instructions for generating visible elements from the user interface output are shown. These include: entry command instructions 226 for defining an entry box 156; choice list command instructions 224 for defining a choice list 154; and action list command instructions 222 for defining an action list 152. Notice also that in this embodiment the page command instruction 229 includes an event processor reference instruction 221 which specifies an event processor DLL 160 to which events are to be dispatched.

An example of the operation of an automated transaction machine employing the invention is as follows. In operation of the transaction machine, a user may input a series of numbers on an input device such as a keypad 12. If the user interface is currently displaying an entry field for an input, such as an access number as in FIG. 4, the TMI is operative to modify the user interface output to alter the display and place visual numbers in the access number entry field 156. However if the user interface is not currently displaying a field for which a numerical input is appropriate, such an input will preferably be ignored. For example, if the user interface is currently only presenting an action list for which a numeric input is not appropriate, and a user inputs a sequence of numbers, the TMI is preferably operative to ignore the input signals associated with the input numbers.

Alternatively if the user inputs an access number into the keypad and presses an "enter" key, the TMI may be operative for example to both include the numbers input in the user interface entry field 156 and to generate an event. The event information includes the type of event (i.e. change) and the identifying name (ID) of the entry field 156 that was changed (i.e. phone).

In the example shown in FIG. 4, if a user provides an input by tapping a touch screen over an action list button 152 (i.e. cancel), the TMI is operative to generate an action event. In the described embodiment this event will include the event ID (i.e. action) and the ID of action list button 152 associated with the action (i.e. cancel).

In this example, the event processor may need additional information about the user interface currently being generated by the computer before it can properly evaluate an event. This information could be a value that was entered in the entry field 156 for the current user interface output page window 159. The event processor is operative to call a "get" subroutine, such as subroutine 281 of the TMI API 28 as discussed above in connection with FIG. 6, to get values such as an access number entered in an entry field 156. The TMI will then send the requested information back to the event processor. In the described embodiment the event processors can use the TMI API to get and set values in the user interface, to enable and disable elements in the user interface, and to have the TMI switch to a different page of command instructions or a different instruction document.

Figure 11:
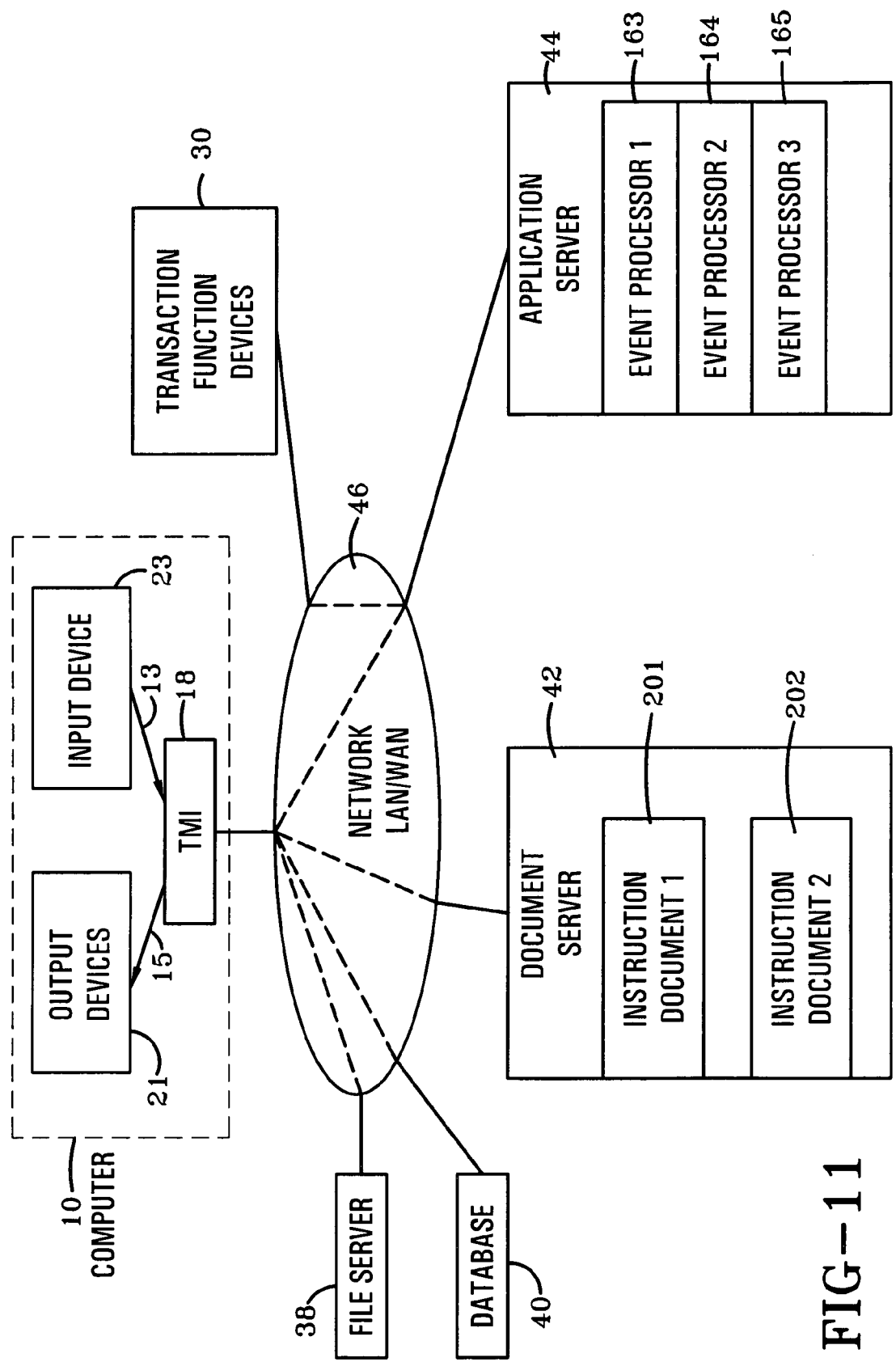
FIG. 11 is a schematic view representative of an alternative exemplary embodiment of the invention in which the instruction documents and the event processors are located on networked computers.

In this example the event processor reference command specifies a DLL. However, in alternate embodiments the command instruction may also designate which function in the DLL to call. FIG. 11 schematically represents an alternative embodiment in which event processors 163, 164 and 165 are configured as part of an object server 44 such as a Microsoft® Transaction Server™. In this embodiment the command instruction may designate the particular server, the particular object, and the particular method in the object to which the event should be sent. Further as represented in the alternative embodiment of FIG. 11, the instruction documents need not reside in files on the same computer as the TMI 18. Instead, the instruction documents may be accessible through a file server 38, a database 40, or a document server 42. In addition, the transaction function devices 30 may not be directly attached to the same computer as the computer on which the TMI is running, but instead could be located elsewhere in a network.

Figure 12:
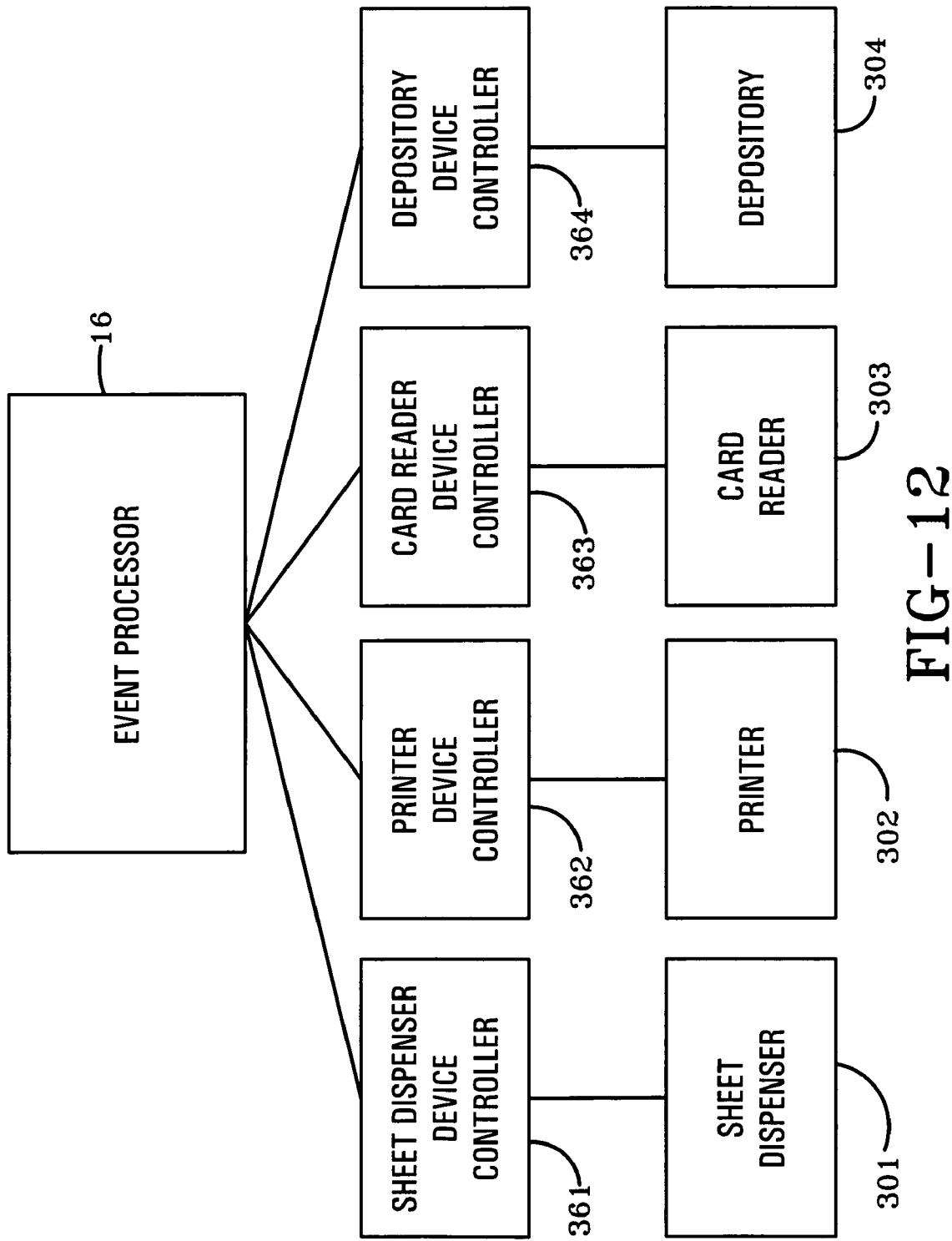
FIG. 12 is a schematic view representative of the event processor in communication with a plurality of device controllers for individual transaction function devices in an alternative embodiment of the automated transaction machine.

FIG. 12 represents an embodiment of the invention where an event processor is operative to communicate with a plurality of device controllers schematically indicated 361, 362, 363 and 364. These device controllers are operative to control the operation of transaction function devices such as a sheet dispenser 301, a printer mechanism 302, a card reader 303, or a depository 304. For example when the TMI sends the event processor 16 the event for a user interface action concerning a dispense of sheets, the event processor can execute the instructions necessary to have a sheet dispenser device controller 361 operate the sheet dispenser 301. The event processor 16 may also evaluate the success of the operation of the sheet dispenser 301 and call the appropriate TMI API modify functions to have the TMI modify the user interface output from the computer to display an element corresponding to the status of the dispense of sheets on a display screen. It should be understood that FIG. 12 is exemplary and that other arrangements of device controllers and transaction function devices may be used.

Computer software used in operating automated transaction machines of the present invention and connected computers may be loaded from storage articles of various types into respective computers. Such software may be included on and loaded from one or more articles such as diskettes or compact disks. Such software may also be included on articles such as hard disk drives, tapes, read only memory devices or another computer. Other articles which include data representative of the instructions for operating computers in the manner described herein are suitable for use in achieving operation of transaction machines and systems in accordance with embodiments of the present invention.

As explained herein the principles of the present invention enable the use of substantially identical instruction documents to control the interfaces and devices of machines that are substantially different. This includes for example machines which have different types of operating systems. This further includes machines which have different types of output devices such as graphical displays, character based displays, braille character outputs, audio displays, animated displays and other types of outputs. This further includes machines with different types of input devices such as function keys, keys in keypads or keyboards, touch screens, audio inputs or other types of inputs. Machines may include different types of transaction function devices which carry out transaction functions in different ways and/or in response to different user or machine inputs.

The exemplary embodiments of the automated transaction machines and systems described herein have been described with reference to particular software components and features. Other embodiments of the invention may include other or different software components which provide similar functionality. Further while the invention is specifically adapted for use in connection with automated transaction machines the present invention may find applicability in other types of machines and systems.

Thus the new automated transaction machine and system of the present invention achieves the above state objectives, eliminates difficulties encountered in the use of prior devices and systems, solves problems and attains the desired results described herein.

In the foregoing description certain terms have been used for brevity, clarity and understanding. However, no unnecessary limitations are to be implied therefrom because such terms are for descriptive purposes and are intended to be broadly construed. Moreover the descriptions and illustrations herein are by way of examples and the invention is not limited to the details shown and described.

In the following claims any feature described as means for performing a function shall be construed as encompassing any means known to those skilled in the art to be capable of performing the recited function, and shall not be deemed limited to the particular means shown in the foregoing description or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods, processes and relationships are set forth in the appended claims.

I claim:

1. An automated transaction machine apparatus comprising:
    at least one computer;
    a plurality of transaction function devices in operative connection with the at least one computer, wherein at least one of the transaction function devices includes a cash dispenser;
    a first input device of a first type in operative connection with the at least one computer;
    a second input device of a second type in operative connection with the at least one computer, wherein the first type and the second type are different types of input devices;
    a first output device in operative connection with the at least one computer, wherein the first input device is associated with the first output device;
    a second output device in operative connection with the at least one computer, wherein the second input device is associated with the second output device;
    a common instruction document in operative connection with the at least one computer, wherein the common instruction document includes command instructions that define features for producing a user interface that is operative to cause at least one of the transaction function devices to operate, wherein the command instructions include at least one XML tag; and
    at least one transaction machine interface software component in operative connection with the at least one computer, wherein the at least one transaction machine interface software component is operative to cause the at least one computer to access the common instruction document, wherein the at least one transaction machine interface software component is further operative to cause the at least one computer to output through the first output device a first user interface responsive to the command instructions and the first type of the first input device, wherein the first user interface includes at least one first visible element that corresponds to at least one input receivable through the first type of input device, wherein the at least one transaction machine interface software component is further operative to cause the at least one computer to output through the second output device a second user interface responsive to the command instructions and the second type of the second input device, wherein the second user interface includes at least one second visual element that corresponds to at least one input receivable through the second type of input device, and wherein the at least one transaction machine interface software component is operative to cause the at least one computer to operate the at least one transaction function device responsive to a first input through the first input device provided when the first user interface is being outputted through the first output device, and wherein the at least one transaction machine interface software component is operative to cause the at least one computer to operate the at least one transaction function device responsive to a second input through the second input device provided when the second user interface is being outputted through the second output device.

2. The apparatus according to claim 1, further comprising a plurality of event processor software components in operative connection with the at least one computer, wherein the command instructions specify a first one of the plurality of event processor software components, wherein the at least one transaction machine interface software component is operative responsive to either the first input or the second input to cause the at least one computer to access the first one of the plurality of event processor software components specified by the command instructions, wherein the at least one computer processor is responsive to the first one of the plurality of event processor software components to cause the at least one transaction function device to operate.

3. The apparatus according to claim 2, wherein the first input device includes a key, and wherein the second input device includes a touch screen.

4. A method comprising:
    a) accessing a common instruction document with at least one cash dispensing automated transaction machine, wherein the instruction document includes command instructions that define features for producing a user interface screen that is operative to cause at least one of a plurality of transaction function devices in the at least one machine to operate, wherein the command instructions include at least one XML tag, wherein the plurality of transaction function devices includes a cash dispenser;
    b) presenting through a first display device of the at least one machine a first view of the user interface screen responsive to the command instructions and a first type input device associated with the first display device, wherein the first view of the user interface screen includes at least one first visible element that corresponds to at least one input receivable through the first type input device usable to cause operation of the at least one transaction function device responsive to the first type of the first input device;
    c) receiving with the at least one machine at least one first input through the first type input device, when the first view is being presented through the first display device;
    d) causing with the at least one machine the at least one transaction function device to operate responsive to the at least one first input;

e) presenting through a second display device of the at least one machine a second view of the user interface screen responsive to the command instructions and a second type input device associated with the second display device, wherein the second view of the user interface screen includes at least one second visible element that corresponds to at least one input receivable through the second type input device usable to cause operation of the at least one transaction function device, wherein the first type input device and second type input device are different types of input devices;

f) receiving with the at least one machine at least one second input through the second type input device when the second view is being presented; and g) causing with the at least one machine, the at least one transaction function device to operate responsive to the at least one second input.

5. The method according to claim 4, wherein steps (d) and (g) include operating the at least one transaction function device responsive to a common event processor software component specified by the command instructions.

6. The method according to claim 5, wherein in step (b) the first type input device includes a key, and where in step (e), the second type input device includes a touch screen.

7. Computer readable media bearing instructions which are operative to cause at least one computer in at least one automated transaction machine to cause the at least one automated transaction machine carry out a method comprising:

a) accessing a common instruction document with at least one cash dispensing automated transaction machine, wherein the instruction document includes command instructions that define features for producing a user interface screen that is operative to cause at least one of a plurality of transaction function devices in the at least one automated transaction machine to operate, wherein the command instructions include at least one XML tag, wherein the plurality of transaction function devices includes a cash dispenser;

b) presenting through a first display device of the at least one automated transaction machine a first view of the user interface screen responsive to the command instructions and a first type input device associated with the first display device, wherein the first view of the user interface screen includes at least one first visible element that corresponds to at least one input receivable through the first type input device usable to cause operation of the at least one transaction function device;

c) receiving with the at least one automated transaction machine at least one first input through the first type input device, when the first view is being presented through the first display device;

d) causing with the at least one automated transaction machine the at least one transaction function device to operate responsive to the at least one first input;

e) presenting through a second display device of the at least one automated transaction machine a second view of the user interface screen responsive to the command instructions and a second type input device associated with the second display device, wherein the second view of the user interface screen includes at least one second visible element that corresponds to at least one input receivable through the second type input device usable to cause operation of the at least one transaction function device, wherein the first type input device and second type input device are different types of input devices;

f) receiving with the at least one automated transaction machine at least one second input through the second type input device when the second view is being presented through the second display device; and g) causing with the at least one automated transaction machine, the at least one transaction function device to operate responsive to the at least one second input.

* * * * *

UNITED STATES PATENT AND TRADEMARK OFFICE
CERTIFICATE OF CORRECTION

PATENT NO. : 7,613,643 B1
APPLICATION NO. : 11/136865
DATED : November 3, 2009
INVENTOR(S) : Harold V. Putman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 727 days.

Signed and Sealed this

Nineteenth Day of October, 2010

David J. Kappos
*Director of the United States Patent and Trademark Office*